United States Patent Office 2,914,808
Patented Dec. 1, 1959

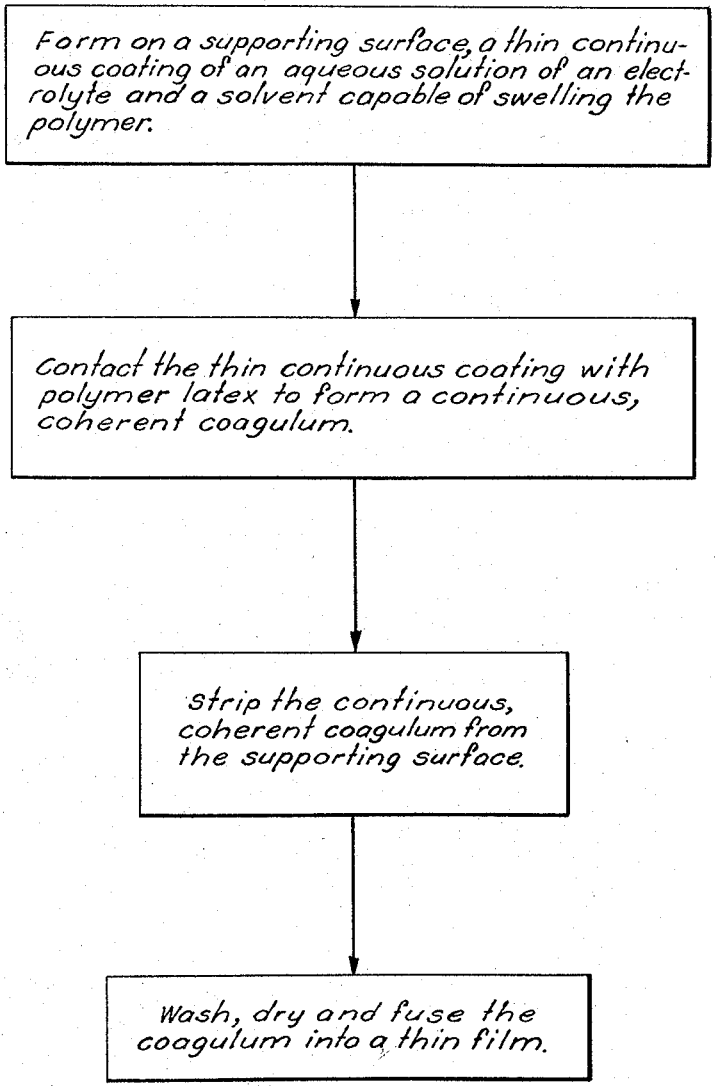

2,914,808

PROCESS FOR FORMING FILMS FROM NON-ELASTIC POLYMER LATEXES

Jack J. Adams, Midland, Mich., assignor to The Dow Chemical Company, Midland, Mich., a corporation of Delaware Application March 16, 1956, Serial No. 571,887

6 Claims. (Cl. 18—57)

This invention relates to an improved process for forming coherent films from latexes of polymers. More particularly it relates to such a process by which heretofore non-film forming latexes can be formed into films.

Coherent films have been prepared from polymers by a number of known methods. The best known involves extrusion which requires a considerable investment in extruding equipment and auxiliary materials. Great care must be used when extruding heat sensitive polymers so that they will not be degraded to a point of being commercially useless. The casting of polymer solutions is another known film-making procedure, and involves costly solvents and consequently requires solvent recovery means. Some polymers are soluble only in specific solvents which may present additional problems of flammability and toxicity. The production of films from polymer latexes is another method which appears most attractive from the viewpoints of capital investment, operating economics, and ease of fabrication. However, the casting of such films requires delicate control of operating conditions and not all polymer latexes give coherent films. A more recent method for preparing films from latexes of polymers involves the coagulation of certain polymer latexes on a surface having a coating of an aqueous solution of coagulant. That method was less costly and presented fewer operational difficulties than any prior method, but could only be used with certain latexes.

It would be desirable and it is accordingly the principal object of this invention to provide a process for preparing coherent films from polymer latexes.

It is a further object to provide such a process whereby latexes which were not heretofore film forming may be used to form coherent films.

It is a still further object to provide such a process for preparing plasticized films.

The above and related objects are accomplished by means of a process wherein a wettable surface is coated with a layer of an aqueous coagulant solution consisting of an electrolyte and a water-miscible volatile organic solvent for the polymer, bringing that layer of aqueous coagulant solution into contact with a polymer latex to deposit a coagulated film of polymer thereon, and thereafter washing the film to remove coagulant and solvent, and drying the film while fusing the polymer particles. With this process continuous coherent films are produced.

Any polymer latex capable of local coagulation may be employed in the process. Among such latexes may be mentioned the latexes of the copolymers of vinylidene chloride with another copolymerizable monomer such as vinyl chloride, acrylonitrile, and vinyl acetate, the copolymers of vinyl chloride with another copolymerizable monomer such as acrylonitrile, and vinyl acetate, and ternary polymers such as those composed of vinylidene chloride, vinyl chloride, and acrylate esters and of vinyl chloride, vinyl acetate, and acrylate esters. These copolymers are all characterized as being non-elastic as compared with rubber.

Methods for producing such latexes are well known in the art. Typically a monomeric material is dispersed to form an oil in water emulsion in an aqueous medium comprising a water soluble polymerization catalyst, such as potassium persulfate and an emulsifying agent for the particular monomer. The emulsion is subjected to polymerization conditions by warming it. Following polymerization, the latex is commonly filtered to remove any precoagulum. If the latex is to be stored for prolonged periods an additional amount of emulsifying agent is added to impart shelf stability to the latex. It has been found that for film forming applications a polymer latex should contain at least 25 percent of non-volatile solids. When less than that amount of solids is present the resultant films regardless of the method of production are so weak as to be of little value.

The electrolyte coagulants capable of coagulating polymer latexes are well-known in the art. Among these may be mentioned the alkali metal salts and the alkaline earth salts which are water soluble. Typical examples include sodium chloride, calcium chloride, magnesium chloride, and sodium or aluminum sulfate. It is well-known that salts having polyvalent cations are more efficient coagulants than those having only monovalent cations.

The solvents which may be employed are those which are miscible with water, capable of at least swelling the polymer, and at least as volatile as water. Typical examples of such solvents are acetone, dioxane, and tetrahydrofuran. The solvent must be miscible with water to present a homogeneous phase of coagulant solution to the latex. When water-immiscible solvents are attempted to be used the solvent forms droplets in the film of coagulant and coherent films cannot result. The solvent must be capable of at least swelling the polymer so that it may diffuse into the polymer particles to soften them. Non-solvents have no softening effect and therefore do not confer film forming properties on an otherwise non-film forming latex. The solvents must be at least as volatile as water so that they can be removed during the subsequent drying step. When solvents are employed which are not as volatile as water the possibility exists that the solvent may be entrapped within the dried film and be difficult to remove.

The concentrations of electrolyte coagulant and solvent in the aqueous coagulant solution may be varied within wide limits. The electrolyte concentration may be varied to some extent by its solubility in water at the temperature being employed. Additionally the coagulant in the film must be washed out of the film prior to fusion, since such materials weaken the film and cause a certain amount of undesirable opacity. The concentration of electrolyte may be further limited by its effects on the solubility of the volatile solvent. It has been found that concentrations of from 3 to 10 percent by weight of electrolyte minimize most of those difficulties and such concentrations are accordingly preferred. When less than 3 percent is employed instant local coagulation is difficult to achieve.

The concentration of volatile solvent in the coagulant will depend upon the particular solvent and latex being employed and to some extent on its solubility in the electrolyte solution. Concentrations of from 10 to 40 percent by weight based on the weight of electrolyte solution have been found operable although 20 to 30 percent are preferred. When less than 10 percent is used there is usually insufficient softening to impart film forming tendencies. When greater than 40 percent is used no additional benefits accrue and the solvent removal step is greatly extended.

In operation, the process consists of bringing a wettable surface into contact with the aqueous coagulant and allowing it to drain so that a liquid film of coagulant and solvent remains on the surface. It is frequently desirable to include a non-ionic wetting agent in the coagulant solution to aid in spreading it on the supporting surface. The surface may be smooth or porous so long as the film may remain on the surface. The surface with the thin liquid coagulant film is then brought into contact with the polymer latex, until a polymer film forms thereon. The coagulated polymer film is stripped from the surface and washed with water to remove the electrolyte coagulant.

It is possible to dissolve some additional solvent in the water rinse bath following coagulation to be assured that the solvent in the film will not all be lost with the consequent loss of softening prior to drying and fusion. The amount of solvent so employed will generally be as great as that used in the aqueous coagulant bath. The film is then dried and fused to produce a coherent continuous film.

The process lends itself well to continuous operation when the surface used is a roll. In this case a transfer roll may be used to apply the coagulant to the roll surface and the so-treated roll is disposed to dip into and rotate in a trough of latex. The resulting film may be stripped from the roll before the latter makes a complete revolution, and is then washed, dried, and fused. However, individual articles may be prepared by dipping glass or ceramic plates or forms into the coagulant, then into the latex and carrying out the subsequent steps.

The coagulated polymer film that is stripped from the surface is very weak and care must be taken in handling such film. The washing operation is most conveniently carried out by immersing the film in a very gently agitated water bath where the buoyant effect of the water can aid the washing operation by not exerting undue stress on the film until fushion can be effected.

Following washing, the film is allowed to drain dry and is then dried and fused. The drying and fusion may be separate steps or may be carried out together. The drying operation being an evaporative step to remove solvent and water will be carried out at a tempeature up to 100° C. and the fusion will be carried out at a temperature below the normal softening point of the polymer but sufficient to cause fusion of the solvent softened particles.

The operation and advantages of the process will be more apparent from the following illustrative examples wherein all parts and percentages are by weight unless otherwise indicated.

*Example I*

A sheet of brown kraft paper was dipped into an aqueous coagulant bath consisting of 25 parts dioxane and 5 parts calcium chloride in 70 parts water, and allowed to drain. The sheet was then dipped into a latex of a polymer prepared from a monomeric material consisting of 50 percent vinylidene chloride, 40 percent vinyl chloride, and 10 percent ethyl acrylate and which contained 30 percent non-volatile solids. The coagulated film was peeled from the paper and rinsed in a water bath containing 20 percent dioxane. The film was allowed to drain, and was dried and fused under infra-red lamp. A tough, clear, flexible, self-supporting film was obtained.

By way of contrast when the dioxane was omitted from the aqueous coagulant bath, the coagulum formed on the surface was not a coherent film and could not be peeled from the paper.

*Example II*

A tough, clear, flexible self-supporting film was prepared from a latex of a polymer prepared from 60 percent vinyl acetate, 30 percent vinyl chloride, and 10 percent ethyl acrylate, by rotating in such a latex a ceramic roll carrying a coating of an aqueous acetone solution of aluminum sulfate, and stripping, washing, drying and fusing the film.

I claim:
1. A process for preparing thin, continuous, coherent, self-supporting films from polymer latexes of non-elastic polymers as compared with rubber consisting of providing a thin continuous coating of an aqueous coagulant comprising coagulative amounts of a water-soluble electrolyte coagulant for said latex and an organic water-miscible solvent at least as volatile as water and capable of at least swelling said polymer upon a continuous surface wettable thereby, contacting the so-treated surface with a polymer latex containing at least 25 percent non-volatile solids to form a coherent continuous coagulum on said surface, stripping said coagulum from said surface, washing said coagulum with water to remove substantially all of said electrolyte coagulant, drying said film to remove the water and solvent, and fusing the washed weak film to form a thin, continuous, coherent, self-supporting film.

2. The process claimed in claim 1 wherein the polymer is prepared from a monomer comprising vinylidene chloride and vinyl chloride.

3. The process claimed in claim 2 wherein the polymer in said latex is a ternary polymer prepared from vinylidene chloride, vinyl chloride, and an acrylate ester.

4. The process claimed in claim 1 wherein the polymer in said latex is a ternary polymer prepared from vinyl acetate, vinyl chloride, and an acrylate ester.

5. The process claimed in claim 1 wherein said solvent is selected from the group consisting of dioxane, acetone, and tetrahydrofuran.

6. The process claimed in claim 1 wherein said organic solvent is dioxane.

References Cited in the file of this patent

UNITED STATES PATENTS

| | | |
|---|---|---|
| 1,968,887 | Hansen | Aug. 7, 1934 |
| 2,233,442 | Wiley | Mar. 4, 1941 |
| 2,378,700 | Habib et al. | June 19, 1945 |
| 2,509,857 | Borcherdt et al. | May 30, 1950 |
| 2,512,490 | Drisch et al. | June 20, 1950 |
| 2,530,362 | Morris | Nov. 14, 1950 |
| 2,707,805 | Smith et al. | May 10, 1955 |
| 2,775,507 | Downing et al. | Dec. 25, 1956 |